(12) United States Patent
Adil et al.

(10) Patent No.: US 9,753,179 B2
(45) Date of Patent: *Sep. 5, 2017

(54) METHODS AND APPARATUS FOR DETERMINING DOWNHOLE FLUID PARAMETERS

(75) Inventors: Abdur Rahman Adil, Sindh (PK); Elena Borisova, Paris (FR); Tullio Moscato, Paris (FR)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 624 days.

This patent is subject to a terminal disclaimer.

(21) Appl. No.: 14/125,291

(22) PCT Filed: Jun. 13, 2012

(86) PCT No.: PCT/US2012/042149
§ 371 (c)(1),
(2), (4) Date: Jan. 22, 2014

(87) PCT Pub. No.: WO2012/174048
PCT Pub. Date: Dec. 20, 2012

(65) Prior Publication Data
US 2014/0151032 A1    Jun. 5, 2014

Related U.S. Application Data

(60) Provisional application No. 61/496,180, filed on Jun. 13, 2011.

(51) Int. Cl.
*G01V 9/00*    (2006.01)
*E21B 47/10*    (2012.01)
(Continued)

(52) U.S. Cl.
CPC .............. *G01V 9/005* (2013.01); *E21B 47/00* (2013.01); *E21B 47/065* (2013.01); *E21B 47/10* (2013.01); *E21B 47/1005* (2013.01); *E21B 49/08* (2013.01)

(58) Field of Classification Search
CPC .... E21B 47/065; E21B 47/1005; E21B 47/00; E21B 49/08; E21B 47/10; E21B 43/24; G01V 9/005; G01V 1/40; G01V 3/18
See application file for complete search history.

(56) References Cited

U.S. PATENT DOCUMENTS

| 4,547,080 A | 10/1985 | Dunn et al. |
| 4,852,790 A | 8/1989 | Karlinski |

(Continued)

FOREIGN PATENT DOCUMENTS

| EP | 1435430 A1 | 7/2004 |
| GB | 2395969 | 6/2004 |

(Continued)

OTHER PUBLICATIONS

International search report for the equivalent PCT patent application No. PCT/US2012/042147 issued on Aug. 31, 2012.

(Continued)

*Primary Examiner* — Yong-Suk (Philip) Ro
(74) *Attorney, Agent, or Firm* — Michael L. Flynn; Jody Lynn DeStefanis; Robin Nava

(57) ABSTRACT

Methods for determining downhole fluid parameters include disposing apparatus including a sensor in a fluid in a wellbore. The sensor includes a heater and a temperature sensor, and the fluid is flowing at a velocity of about zero centimeters per second to about ten centimeters per second. The fluid includes particulates, paraffin or asphaltenes. The methods further include obtaining a first measurement via the heater and obtaining a second measurement via the (Continued)

temperature sensor. Based on the first measurement and the second measurement, the velocity of the fluid is determined.

18 Claims, 10 Drawing Sheets

(51) Int. Cl.
*E21B 47/06* (2012.01)
*E21B 49/08* (2006.01)
*E21B 47/00* (2012.01)

(56) References Cited

U.S. PATENT DOCUMENTS

| | | | |
|---|---|---|---|
| 4,979,112 A | 12/1990 | Ketcham | |
| 5,415,037 A | 5/1995 | Griston | |
| 5,428,994 A | 7/1995 | Wenzel et al. | |
| 5,551,287 A | 9/1996 | Maute et al. | |
| 5,610,331 A | 3/1997 | Georgi | |
| 5,890,538 A | 4/1999 | Beirute et al. | |
| 5,965,813 A | 10/1999 | Wan et al. | |
| 6,176,323 B1 | 1/2001 | Weirich | |
| 6,227,045 B1 * | 5/2001 | Morse | E21B 47/1005 166/264 |
| 6,751,556 B2 | 6/2004 | Schroeder et al. | |
| 6,856,909 B2 | 2/2005 | Banning-Geertsma | |
| 6,889,544 B2 | 5/2005 | Tanimoto et al. | |
| 7,000,692 B2 | 2/2006 | Hosie et al. | |
| 7,003,405 B1 | 2/2006 | Ho | |
| 7,536,905 B2 | 5/2009 | Jalali et al. | |
| 7,731,421 B2 | 6/2010 | Hadley | |
| 2002/0100316 A1 | 8/2002 | James et al. | |
| 2003/0051919 A1 | 3/2003 | Moore et al. | |
| 2004/0043501 A1 | 3/2004 | Means et al. | |
| 2004/0104045 A1 | 6/2004 | Larovere | |
| 2004/0112596 A1 | 6/2004 | Williams et al. | |
| 2004/0252748 A1 | 12/2004 | Gleitman | |
| 2005/0263281 A1 | 12/2005 | Lovell et al. | |
| 2006/0010973 A1 | 1/2006 | Brown | |
| 2007/0158064 A1 | 7/2007 | Pribnow et al. | |
| 2007/0289744 A1 | 12/2007 | Bingamon et al. | |
| 2007/0295081 A1 | 12/2007 | Orban et al. | |
| 2008/0023196 A1 | 1/2008 | Crawley et al. | |
| 2008/0137711 A1 | 6/2008 | Gleitman | |
| 2008/0236836 A1 | 10/2008 | Weng | |
| 2008/0308272 A1 | 12/2008 | Thomeer et al. | |
| 2009/0091320 A1 | 4/2009 | Flaum et al. | |
| 2009/0145601 A1 | 6/2009 | Bailey | |
| 2009/0151937 A1 | 6/2009 | Goodwin et al. | |
| 2010/0051264 A1 | 3/2010 | Willauer | |
| 2010/0073189 A1 | 3/2010 | Mandal et al. | |
| 2010/0228502 A1 | 9/2010 | Atherton | |
| 2010/0230105 A1 | 9/2010 | Vaynshteyn | |
| 2010/0294021 A1 | 11/2010 | Makino et al. | |
| 2011/0017468 A1 | 1/2011 | Birch et al. | |
| 2011/0192598 A1 | 8/2011 | Roddy et al. | |
| 2011/0315375 A1 | 12/2011 | Moscato et al. | |

FOREIGN PATENT DOCUMENTS

| | | |
|---|---|---|
| WO | 99/34198 | 7/1999 |
| WO | 2005/064117 | 7/2005 |

OTHER PUBLICATIONS

International search report for the equivalent PCT patent application No. PCT/US2012/042129 issued on Aug. 31, 2012.
International search report for the equivalent PCT patent application No. PCT/US2012/042135 issued on Aug. 31, 2012.
International Search Report issued in PCT Patent Appl. No. PCT/US2012/042149 on Sep. 18, 2013; 3 pages.
International Search Report issued in PCT Patent Appl. No. PCT/US2012/042153 on Sep. 18, 2013; 2 pages.
International Search Report issued in PCT Patent Appl. No. PCT/US2012/042155 on Nov. 7, 2013; 4 pages.
International Search Report issued in PCT Patent Appl. No. PCT/US2012/042132 on Oct. 31, 2013; 3 pages.
Office Action issued in European Patent Application No. 12800169.0 on Feb. 15, 2016; 4 pages.
Definition of mud pump accessed on Nov. 22, 2016 via United States Department of Labor, Occupational Safety and Health Administration, https://www.osha.gov/SLTC/etools/oilandgas/index.html; 4 pages.
Definition of "drill string" accessed on Nov. 16, 2016 via Schlumberger Oilfield Glossary, http://www.glossary.oilfiled.slb.com/Terms/d/dril_string.aspx; 1 page.
Definition of logging accessed on Nov. 22, 2016 via Schlumberger Oil Filed Glossary, http://www.glossary.oilfiled.slb.com/Terms/l/logging.aspx; 1 page.
Office Action issued in U.S. Appl. No. 14/125,296 on Nov. 29, 2016; 15 pages.
Office Action issued in U.S. Appl. No. 14/125,293 on Dec. 22, 2016; 21 pages.
Office Action issued in U.S. Appl. No. 14/125,295 dated Jun. 21, 2017; 8 pages.
Office Action issued in U.S. Appl. No. 14/125,300 dated Jun. 16, 2017; 11 pages.
Office Action issued in U.S. Appl. No. 14/125,303 dated Apr. 20, 2017; 15 pages.

* cited by examiner

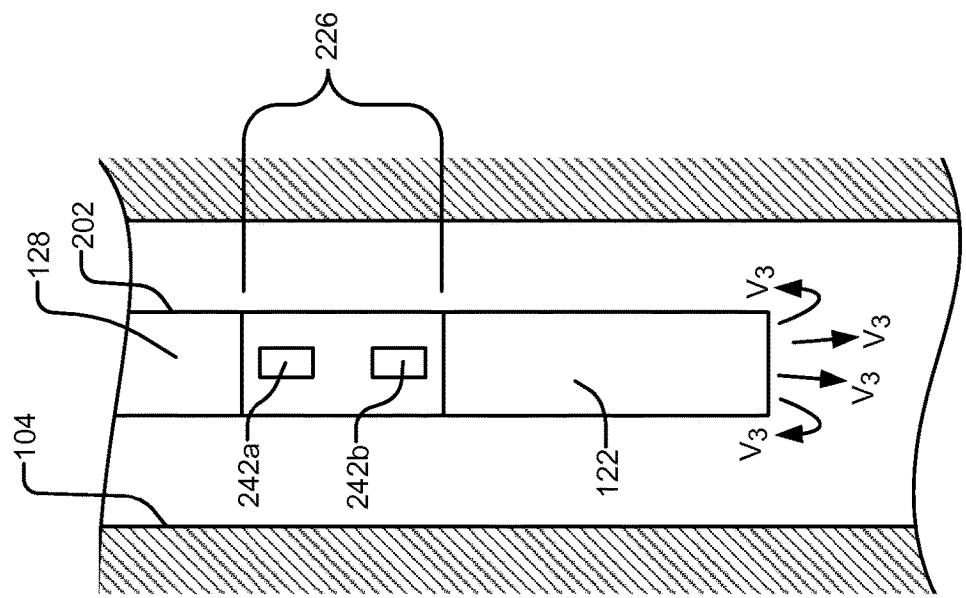
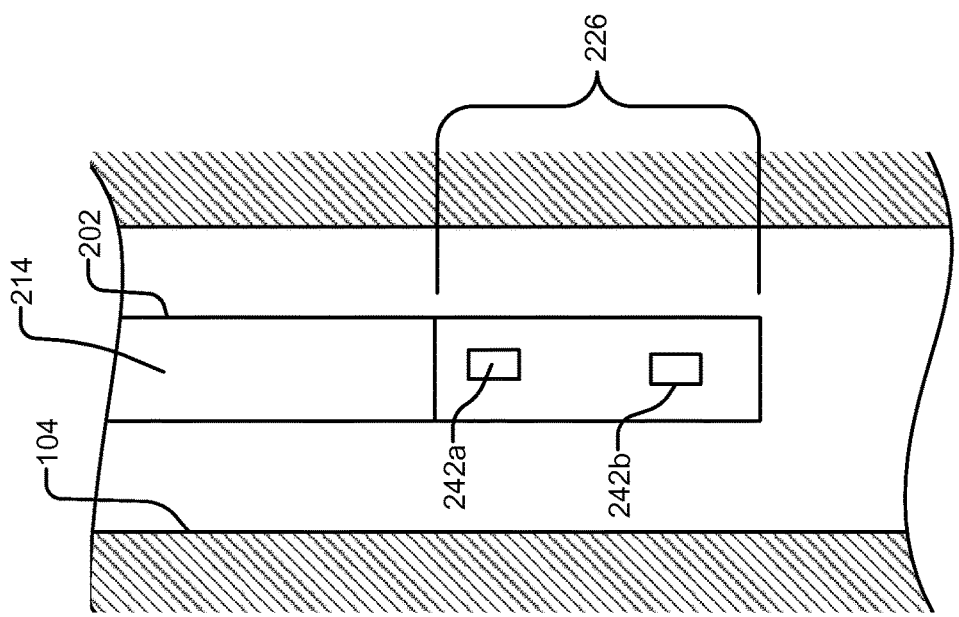

METHODS AND APPARATUS FOR DETERMINING DOWNHOLE FLUID PARAMETERS

RELATED APPLICATIONS

This patent claims the benefit of U.S. Provisional Patent Application Ser. No. 61/496,180, entitled "System and Method for Determining Downhole Fluid and Borehole Parameters," which was filed on Jun. 13, 2011, and is incorporated herein by reference in its entirety.

BACKGROUND

A wellbore may be drilled through a subterranean formation to produce hydrocarbons from the subterranean formation. In some instances, production logging tools and/or completion tools are disposed in the wellbore.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

An example method disclosed herein includes disposing a sensor in a fluid in a wellbore. The sensor includes a heater and a temperature sensor, and the fluid is flowing at a velocity of about zero centimeters per second to about ten centimeters per second. The fluid includes particulates, paraffin or asphaltenes. The example method further includes obtaining a first measurement via the heater and obtaining a second measurement via the temperature sensor. Based on the first measurement and the second measurement, the velocity of the fluid is determined.

Another example method disclosed herein includes disposing a downhole tool in a fluid in a wellbore. The downhole tool includes a sensor having a heater and a temperature sensor. The fluid is flowing at a velocity outside of a velocity range measurable via a spinner flowmeter, and the fluid includes particulates, paraffin or asphaltenes. The example method further includes determining a thermal property between the heater and the fluid via the sensor and, based on the thermal property, determining the velocity of the fluid.

Another example method disclosed herein includes disposing a downhole tool in a wellbore. The downhole tool includes a sensor having a heater and a temperature sensor, and the sensor is capable of sensing fluid flow having of a velocity of about zero meters per second to about ten meters per second. The example method further includes producing fluid from a subterranean formation adjacent the wellbore and obtaining a response of the sensor. Based on the response, the velocity of the fluid is determined.

BRIEF DESCRIPTION OF THE DRAWINGS

Embodiments of methods and apparatus for determining downhole fluid parameters are described with reference to the following figures. The same numbers are used throughout the figures to reference like features and components.

FIG. 2D illustrates various components of another example device that can implement embodiments of the methods and apparatus for determining downhole fluid parameters.

FIG. 2E illustrates various components of yet another example device that can implement embodiments of the methods and apparatus for determining downhole fluid parameters.

DETAILED DESCRIPTION

Figure 1A:
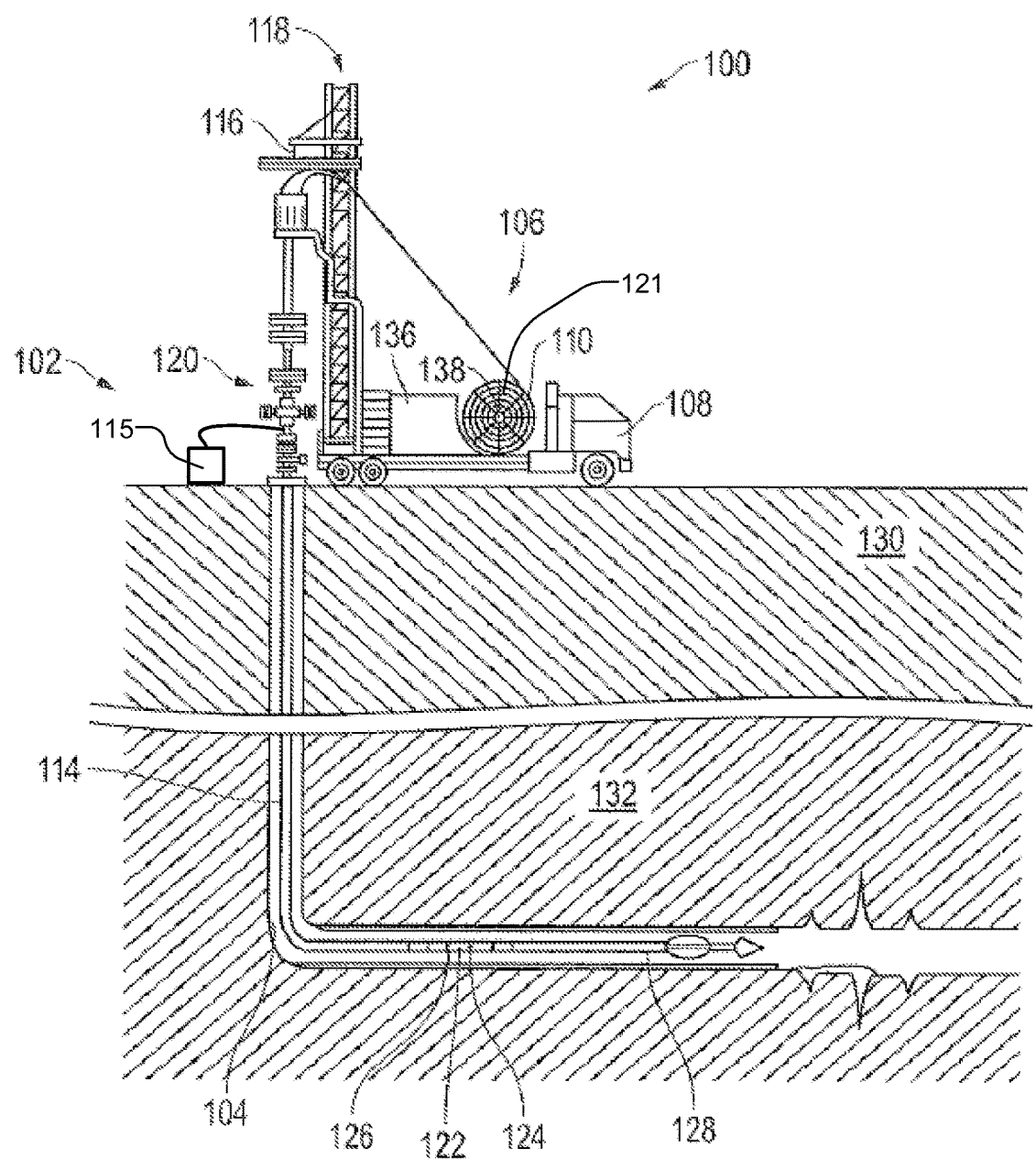
FIG. 1A illustrates an example system in which embodiments of methods and apparatus for determining downhole fluid parameters can be implemented.

It is to be understood that the following disclosure provides many different embodiments or examples for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features such that the first and second features may not be in direct contact.

Although some example fluid sensing systems disclosed herein are discussed as being positioned on treatment tools of a coiled tubing system, other examples are employed with and/or without treatment tools. For example, a fluid sensing element may be employed apart from the coiled tubing system. Thus, in some examples, the fluid sensing system may be deployed by a drill pipe, a drill string or any other suitable conveyance device.

Example apparatus and methods disclosed herein may be used to determine downhole fluid parameters. An example method disclosed herein may include disposing a downhole tool in a wellbore. In some examples, the downhole tool includes a sensor having a heater and a temperature sensor. Fluid may be produced from a subterranean formation adjacent the wellbore, and the fluid may be heated via the heater. In some examples, the fluid includes gas, water, hydrocarbons, particulates (e.g., sand, sediment, rock, etc.), paraffin, asphaltenes, polymer (e.g., a polymer based fluid), a viscoelastic fluid, a surfactant, different phases (e.g., liquids, gases, etc.), fluids of different viscosities, etc. In some examples, the fluid flows at a velocity of about zero centimeters per second to about ten centimeters per second.

The example method may also include obtaining a first measurement via the heater such as, for example, a temperature of the heater and/or an amount of heat dissipated by the heater. In some examples, a second measurement is obtained via the temperature sensor (e.g., a temperature of the fluid). Based on the first measurement and the second measurement, a thermal property (e.g., thermal conductance, normalized heat dissipation, etc.) between the heater and the fluid may be determined. The velocity of the fluid may be determined based on the thermal property. In some examples, the sensors are capable of sensing fluid flow when the fluid is flowing at a velocity of about zero meters per second to a velocity of about ten meters per second.

FIG. 1A is a schematic depiction of a wellsite 100 with a coiled tubing system 102 deployed into a well 104. The coiled tubing system 102 includes surface delivery equipment 106, including a coiled tubing truck 108 with reel 110, positioned adjacent the well 104 at the wellsite 100. The coiled tubing system 102 also includes coiled tubing 114. In some examples, a pump 115 is used to pump a fluid into the well 104 via the coiled tubing. With the coiled tubing 114 run through a conventional gooseneck injector 116 supported by a mast 118 over the well 104, the coiled tubing 114 may be advanced into the well 104. That is, the coiled tubing 114 may be forced down through valving and pressure control equipment 120 and into the well 104. In the coiled tubing system 102 as shown, a treatment device 122 is provided for delivering fluids downhole during a treatment application. The treatment device 122 is deployable into the well 104 to carry fluids, such as an acidizing agent or other treatment fluid, and disperse the fluids through at least one injection port 124 of the treatment device 122.

The example treatment device 122 is optional and its use will depend on the various applications. The coiled tubing system 102 of FIG. 1A is depicted as having a fluid sensing system 126 positioned about the injection port 124 for determining parameters of fluids in the well 104. The fluid sensing system 126 is configured to determine fluid parameters, such as fluid direction and/or velocity. In other examples, other downhole parameters are determined.

In some examples, the coiled tubing system 102 includes a logging tool 128 for collecting downhole data. The logging tool 128 as shown is provided near a downhole end of the coiled tubing 114. The logging tool 128 acquires a variety of logging data from the well 104 and surrounding formation layers 130, 132 such as those depicted in FIG. 1A. The logging tool 128 is provided with a host of well profile generating equipment or implements configured for production logging to acquire well fluids and formation measurements from which an overall production profile may be developed. Other logging, data acquisition, monitoring, imaging and/or other devices and/or capabilities may be provided to acquire data relative to a variety of well characteristics. Information gathered may be acquired at the surface in a high speed manner, and, where appropriate, put to immediate real-time use (e.g. via a treatment application). Some examples do not employ the logging tool 128.

With reference still to FIG. 1A, the coiled tubing 114 with the treatment device 122, the fluid sensing system 126 and the logging tool 128 thereon is deployed downhole. As these components are deployed, treatment, sensing and/or logging applications may be directed by way of a control unit 136 at the surface. For example, the treatment device 122 may be activated to release fluid from the injection port 124; the fluid sensing system 126 may be activated to collect fluid measurements; and/or the logging tool 128 may be activated to log downhole data, as desired. The treatment device 122, the fluid sensing system 126 and the logging tool 128 are in communication with the control unit 136 via a communication link (FIGS. 1B-1D), which conveys signals (e.g., power, communication, control, etc.) therebetween. In some examples, the communication link is located in the logging tool 128 and/or any other suitable location. As described in greater detail below, the communication link may be a hardwire link or an optical link.

In the illustrated example, the control unit 136 is computerized equipment secured to the truck 108. However, the control unit 136 may be portable computerized equipment such as, for example, a smartphone, a laptop computer, etc. Additionally, powered controlling of the application may be hydraulic, pneumatic and/or electrical. In some examples, the control unit 136 controls the operation, even in circumstances where subsequent different application assemblies are deployed downhole. That is, subsequent mobilization of control equipment may not be included.

The control unit 136 may be configured to wirelessly communicate with a transceiver hub 138 of the coiled tubing reel 110. The receiver hub 138 is configured for communication onsite (surface and/or downhole) and/or offsite as desired. In some examples, the control unit 136 communicates with the sensing system 126 and/or logging tool 128 for conveying data therebetween. The control unit 136 may be provided with and/or coupled to databases, processors, and/or communicators for collecting, storing, analyzing, and/or processing data collected from the sensing system and/or logging tool.

In one example, the communication link between the treatment device 122, fluid sensing system 126 and/or logging tool 128 and the surface or control unit 136 may be implemented using a fiber optic or wired telemetry system. As such, the communication link/system may include tubing that provides and/or possesses a certain amount of stiffness in compression, similar to coiled tubing. In some such examples, a fiber optic tube is disposed inside coiled tubing. In some examples, a cross-sectional area of the fiber optic tube may be small relative to an inner area defined by the coiled tubing to limit a physical influence of the fiber optic tube on mechanical behavior of the coiled tubing during deployment and retrieval, thereby preventing "bird-nesting" or bundling within the coiled tubing. In some examples, optical fiber equipped coiled tubing is deployed into and retrieved from a wellbore at a greater speed than coiled tubing with wireline.

Figure 1B:
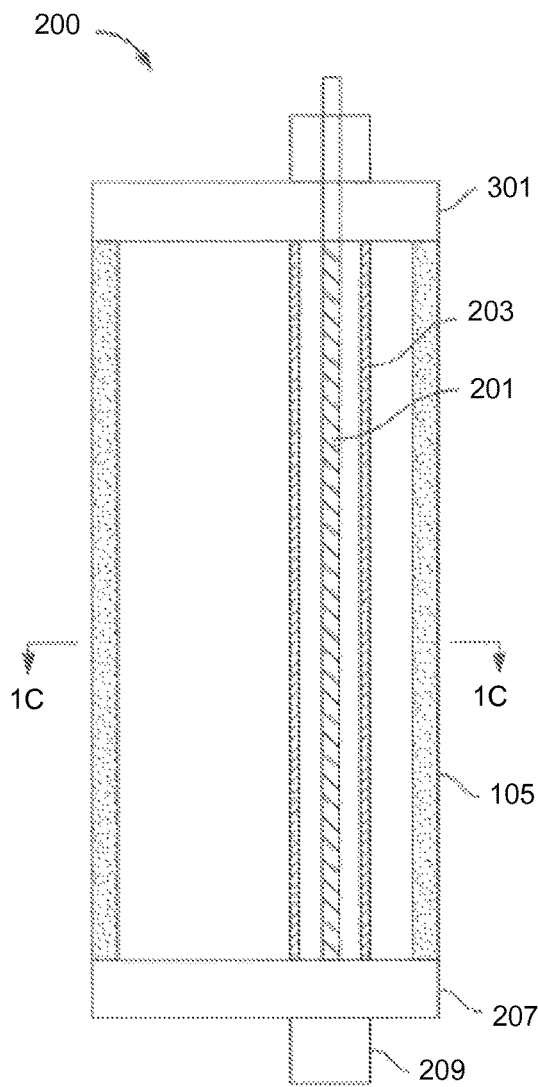
FIG. 1B illustrates various components of an example device that can implement embodiments of the methods and apparatus for determining downhole fluid parameters.

FIG. 1B illustrates an example communication link 200 between the treatment device 122, the fluid sensing system 126, the logging tool 128, and/or the surface or control unit 136. In the illustrated example, the communication link 200 includes a tubular 105 within which a duct or tube 203 is disposed. In the illustrated example, an optical fiber 201 is disposed in the tube 203. In some examples, more than one optical fiber is disposed in the tube 203. In the illustrated example, a surface termination 301 and a downhole termination 207 are provided to couple the optical fiber 201 to one or more devices or sensors 209. In some examples, the optical fiber 201 is a multi-mode optical fiber. In other examples, the optical fiber 201 is a single-mode optical fiber. The devices or sensors 209 are, for example, gauges, valves, sampling devices, temperature sensors, pressure sensors, distributed temperature sensors, distributed pressure sensors, flow-control devices, flow rate measurement devices, oil/water/gas ratio measurement devices, scale detectors, actuators, locks, release mechanisms, equipment sensors (e.g., vibration sensors), sand detection sensors, water detection sensors, data recorders, viscosity sensors, density sensors, bubble point sensors, composition sensors, resistivity array devices and sensors, acoustic devices and sensors, other telemetry devices, near infrared sensors, gamma ray detectors, $H_2S$ detectors, $CO_2$ detectors, downhole memory units, downhole controllers, perforating devices, shape charges, firing heads, locators, and other devices.

Figure 1C:
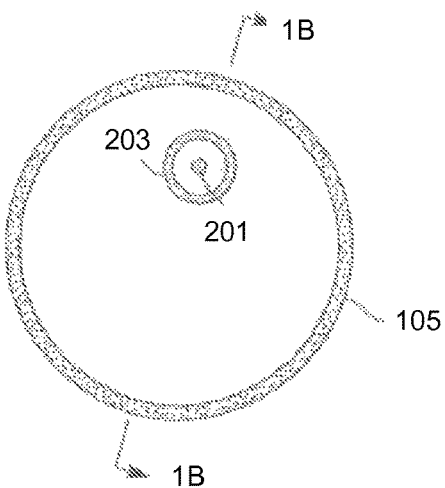
FIG. 1C illustrates various components of the example device of FIG. 1B that can implement embodiments of the example methods and apparatus for determining downhole fluid parameters.

FIG. 1C is a cross-sectional view of the communication link 200 of FIG. 1B. Inside the tube 203, an inert gas such as nitrogen may be used to fill the space between the optical fiber or fibers 201 and the interior of the tube 203. In some examples, the fluid is pressurized to prevent the tube 203 from buckling. In some examples, a laser-welding technique is performed in an enclosed environment filled with an inert gas such as, for example, nitrogen to avoid exposing the optical fiber 201 to water or hydrogen during manufacturing. In some examples, the tube 203 is constructed by bending a metal strip around the optical fiber 201 and then welding that strip to form the tube 203. An example laser-welding technique is described in U.S. Pat. No. 4,852,790, which is hereby incorporated herein by reference in its entirety. In some examples, gel including palladium or tantalum is inserted into an end of the tube 203 to separate hydrogen ions from the optical fiber 201 during transportation of the communication link 200.

Materials suitable for use in the tube 203 provide stiffness to the tube 203, are resistant to fluids encountered in oilfield applications, and/or are rated to withstand the high temperature and high pressure conditions found in some wellbore environments. In some examples, the tube 203 is a metallic material and the tube 203 may include metal materials such as, for example, Inconel™, stainless steel, or Hasetloy™.

Figure 1D:
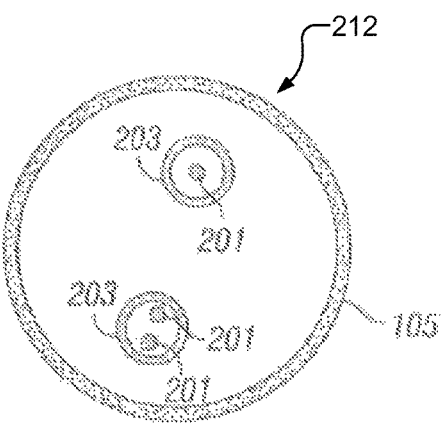
FIG. 1D illustrates various components of another example device that can implement embodiments of the methods and apparatus for determining downhole fluid parameters.

In some examples, the tube 203 has an outer diameter of about 0.071 inches to about 0.125 inches. In some examples, the tube 203 is less than or equal to about 0.020 inches (0.508 mm) thick. The above-noted dimensions are merely examples and, thus, other dimensions may be used without departing from the scope of this disclosure FIG. 1D illustrates another example communication link 212. In the illustrated example, the communication link 212 includes a tubular 105 and a first tube 203 and a second tube 203. A first optical fiber 201 is disposed in the first tube. A second optical fiber 201 and a third optical fiber 201 are disposed in the second tube 203. In some example, the first optical fiber 201 is coupled to one of the devices 209, and the second optical fiber 201 and the third optical fiber 201 are coupled to one or more other ones of the devices 209. In some examples, more than one of the devices 209 may be coupled to a single optical fiber 201.

Figure 2B:
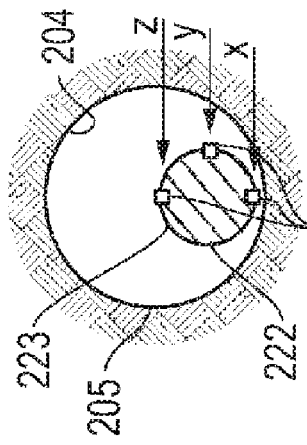
FIG. 2B illustrates various components of the example device of FIG. 2A that can implement embodiments of the methods and apparatus for determining downhole fluid parameters.
Figure 2C:
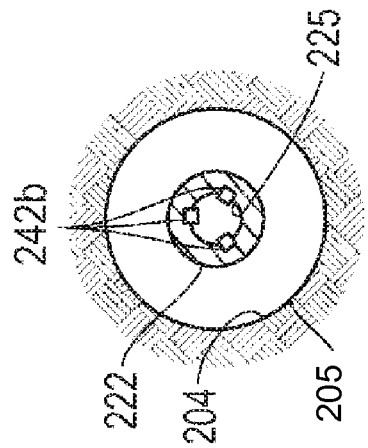
FIG. 2C illustrates various components of the example device of FIG. 2A that can implement embodiments of the methods and apparatus for determining downhole fluid parameters.
Figure 2A:
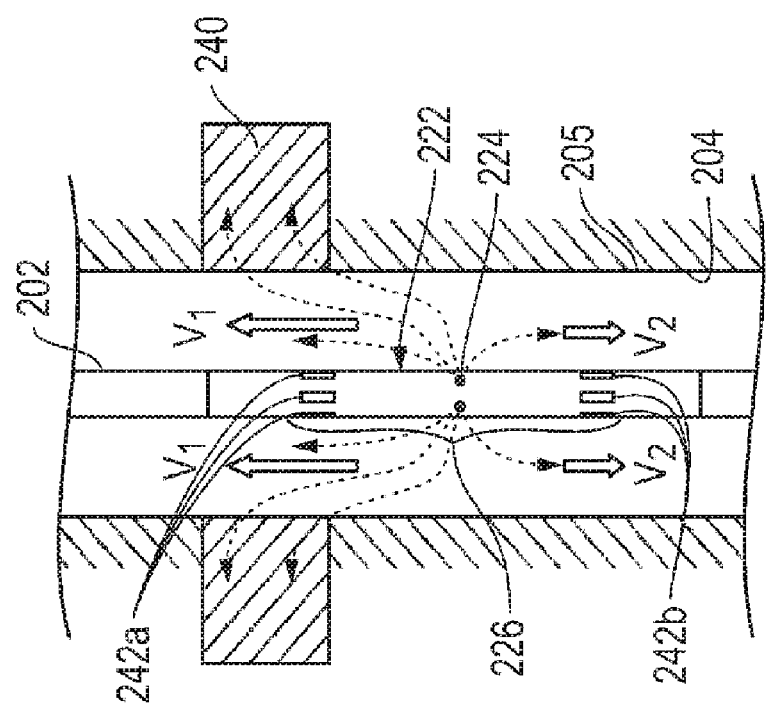
FIG. 2A illustrates various components of an example device that can implement embodiments of the methods and apparatus for determining downhole fluid parameters.

FIGS. 2A-2C are schematic views of a portion of a coiled tubing system 202 with a treatment device 222 and fluid sensing system 226 on a coiled tubing 214 thereof, which may be used to implement the coiled tubing system 102, the treatment device 122 and/or the fluid sensing system 126 of FIG. 1A. FIG. 2A is a longitudinal view, partially in cross-section, depicting the fluid sensing system 226 positioned about the treatment device 222. As shown, the treatment device 222 has injection ports 224 for dispersing injection fluids into a well 204 as schematically depicted by the dashed arrows.

The injection fluid may be dispersed to treat a portion of a well 204, such as pay zone 240, to enhance production of fluid therefrom. As illustrated in FIG. 2A, stimulation fluid, such as acid, may be injected into the well 204 nearby the pay (or oil producing) zone 240 by means of the treatment tool 222. The acid is intended for the pay zone 240, but is shown positioned downhole therefrom. Precisely positioning the injection ports 224 against a zone of interest may be a challenging task due to uncertainties that may exist in target depth and/or tool position. The sensing system 226 around the injection port 224 may be tailored to measure a flow split upstream and downstream of the injection ports 224 in the well 204. Fluid movement may be used to indicate where the pay zone 240 is located relative to the injection port 224. Once known, the position of the treatment device 222 and the injection ports 224 may be positioned to affect treatment as desired.

As the fluid is released from the treatment device 222, the flow of the fluid is split with an upstream portion of the fluid moving upstream and a downstream portion of the injection fluid moving downstream. The upstream portion of the injection fluid travels upstream at a given velocity as indicated by the arrows labeled V1. The downstream portion of the injection fluid travels downstream at a given velocity as indicated by the arrows labeled V2. While the fluid is depicted as flowing in a specific direction, it will be appreciated that the flow of the fluid may vary with operating conditions.

While the example sensing system 226 illustrated in FIGS. 1 and 2A-2C is described in conjunction with the coiled tubing system 102 for determining fluid parameters, the sensing system 226 may also be used in other fluid flow applications such as, for example, detection of fluid cross-flow between zones, production logging (e.g., for single phase velocity, or in conjunction with Flow Scanner Imaging (FSI) complementary to a spinner in a low velocity range), downhole or surface testing in conjunction with use of a flowmeter (e.g., low speed Venturi based flowmeter applications), leakage detection (e.g., with dynamic seals), with other tools where flow velocity measurements is desired, among others. The sensing system 226 may be positioned on any surface, downhole and/or other movable equipment, such as a downhole tool, and/or in fixed equipment, such as a casing (not shown).

The sensing system 226 is depicted in FIG. 2A as having a plurality of sensor elements 242a,b positioned about the treatment device 222. In some examples, one or more sensor elements 242 a,b are positioned about the coiled tubing system 102 to perform fluid and/or other downhole measurements. In some such examples, the sensor elements 242a,b are positioned about the injection port(s) 224 to measure fluid parameters. The fluid measured is the injection fluid dispersed from the treatment device 222, but may also include other fluids in the well (e.g., water, hydrocarbons, gases, etc.) that mix with the injection fluid as it is dispersed.

An upstream portion of the sensor elements 242a are depicted as being positioned on the treatment device 222 a distance upstream therefrom. A downstream portion of the sensor elements 242b are depicted as being positioned on the treatment device 222 a distance downstream therefrom. The upstream sensor elements 242a and/or the downstream sensor elements 242b may be arranged radially about the treatment apparatus 222. In the illustrated example of FIG. 2B, the sensor elements 242a,b are positioned at various radial locations x,y,z about the treatment apparatus 222. While a specific configuration for the sensor elements 242a,b is depicted in FIGS. 2A and 2B, it will be appreciated that one or more sensor elements may be positioned at various locations (longitudinally and/or radially) about the coiled tubing system 202 and/or well 204.

At least some of the sensor elements 242a,b are capable of sensing fluid parameters, such as fluid direction and velocity. In some examples, more than one of the sensor elements 242a,b may be capable of measuring the fluid parameters. In some examples, at least one of the sensor elements 242a for measuring fluid parameters is positioned upstream from the injection port 224, and at least one of the sensor elements 242b for measuring fluid parameters is positioned downstream from the injection port 224. In this configuration, the measurements of the upstream and the downstream fluid sensors 242a,b may be compared to determine fluid parameters, such as fluid direction and/or fluid velocity. The ratio between upper and lower velocities and fluid direction obtained from measurements of the upstream and downstream sensing elements 242a,b may be used to generate real-time monitoring of where the fluid is flowing during the treatment, as will be described further herein. Other downhole parameters may also optionally be measured with the fluid sensing system 226 and/or other sensors positioned about the well.

Comparison of multiple sensing elements 242a,b may be used to account for differences in measurements taken by the various sensing elements 242a,b. In some examples, multiple sensing elements 242a,b are used to provide sufficient redundancy and confidence in the measurement results. This redundancy may also reduce the severity of impact where one or more sensor elements 242a,b fails, such as in harsh downhole environments involving the use of acids. The multiple sensing elements 242a,b may also be used to generate fluid direction and/or velocity information. In such cases, at least one upstream sensor element 242a and at least one downstream sensor element 242b may be used. In some examples, additional sensor elements 242a,b are provided to enhance reliability of the values generated.

In some examples, it may be useful to consider the position of the sensing element 242a,b about the treatment tool 222. The number of arrays (or sets of sensing elements 242a,b), as well as the number of sensing elements 242a,b per array, may vary. As shown in FIG. 2A, the sensing elements 242a,b are positioned upstream and downstream to measure fluid as it passes upstream and downstream from the injection ports 224. In some examples, when using corresponding upstream and downstream sensing elements 242a,b, the corresponding sensing elements 242a,b, are positioned at equal distances from the injection port 224. In some examples, corresponding sensing elements 242a,b are identically matched. Matched sensing elements may be spaced at equal distances.

In the illustrated example, multiple sensing elements 242a,b are also positioned about the circumference of the tool at 90-degree intervals x, y, and z as shown in FIG. 2B. As shown in FIG. 2B, the sensing elements 242b are positioned at radial locations x, y and z about the treatment device 222. The sensing element 242b at position x is against a wall 205 of the well 204. The azimuthal arrangement of sensing elements 242a,b at positions x, y, and z provides redundancy in case one side of measurements is impeded.

An issue may appear when the tool body (e.g., the treatment tool 222) is eccentric (or not concentric) with the well 204 as shown in FIG. 2B. In the illustrated example, the sensing element $242b_x$ located closer to the wall 205 of the well 204 may read a lower flow value than the sensing elements $242b_y$, $242b_z$ positioned farther from the wall. In such cases, it may be desirable to ignore or remove measurements from potential obstructed sensing elements, such as the sensing element $242b_x$.

As shown in FIG. 2B, the sensing elements 242b are positioned on an outer surface 223 of the treatment tool 222. The sensing elements 242b may be flush with the outer surface 223, recessed below the outer surface 223 or extended a distance therefrom. In some examples, the sensing elements 242b are positioned such that each sensing element 242b contacts fluid for measurement thereof, but remains protected. To prevent damage in harsh downhole conditions, protrusion of the sensing elements 242b from the treatment tool may be reduced. As shown in FIG. 2C, the sensing elements 242b may also be positioned inside the treatment tool 222, for example, on an inner surface 225 thereof.

FIGS. 2D and 2E illustrate other portions of the coiled tubing system 202 including the fluid sensing system 226, which may be used to implement the example coiled tubing system 102 of FIG. 1A. In FIG. 2D, the example sensing system 226 is disposed at a lower end of the coiled tubing 114.

In FIG. 2E, the example sensing system 226 is disposed between the logging tool 128 and the treatment tool 122. In the illustrated example, the logging tool 128 is disposed above the sensing system 226 and the treatment tool 122 is disposed below the sensing system 226 in the orientation of FIG. 2E. In some examples, the fluid enters the well 104 as shown by arrows V3. In other examples, the sensing system 226 is disposed at one or more other locations on the coiled tubing 114.

Figure 3:
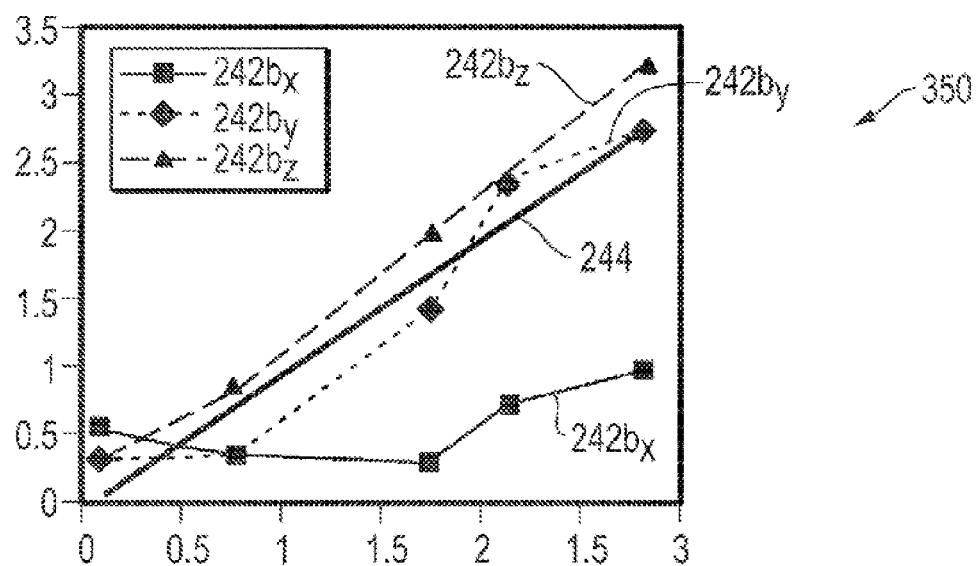
FIG. 3 is a graph depicting sensor measurements taken using the example device of FIG. 2B.

FIG. 3 is a graph 350 depicting sensor data taken from the example sensing elements 242b of FIG. 2B. The graph 350 plots flow velocity (x-axis) as a function of sensor output (y-axis) for sensing elements $242b_x$, $242b_y$, and $242b_z$ at positions x, y and z, respectively. As depicted by the graph 350, the flow velocity of the sensing elements $242b_y$ and $242b_z$ at positions y and z are different from the flow velocity of the sensing element $242b_x$ at position x. In other words, readings of the top sensing element $242b_z$ and the 90-degree sensing element $242b_y$ are substantially consistent in determining the flow velocity. However the bottom sensing element $242b_x$ has a flow velocity that is lower.

The graph 350 indicates that the sensing element $242b_x$ at position x is pressed against the wall 205 of the well 204 and is unable to obtain proper readings. Thus, the measurements depicted by line $242b_x$ taken by sensing element $242b$ at position x may be disregarded. The measurements depicted as lines $242b_y$ and $242b_z$ taken by sensing elements $242b$ at positions y and z, respectively, may be combined using conventional analytical techniques (e.g., curve fitting, averaging, etc.) to generate an imposed flow 244. Thus, by placing several sensing elements $242a,b$ azimuthally around the circumference of a tool and detecting the lowest reading sensing element (e.g., $242b_x$), the azimuth of a flow obstruction may be determined. The sensing element located opposite to the lowest-reading sensing element (e.g., $242b_y$), or combinations of other sensing elements, may then be used to perform the flow measurement.

Figure 4A:
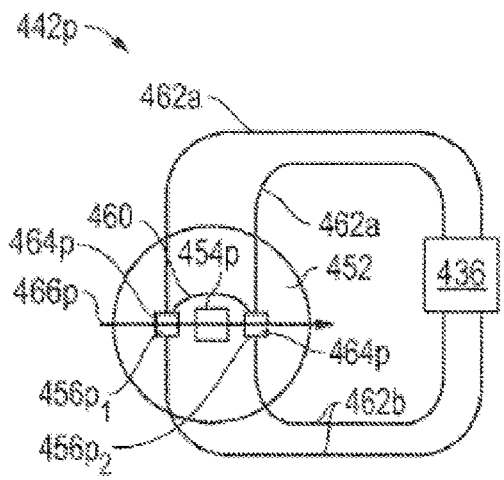
FIG. 4A illustrates various components of an example device that can implement embodiments of the methods and apparatus for determining downhole fluid parameters.
Figure 4B:
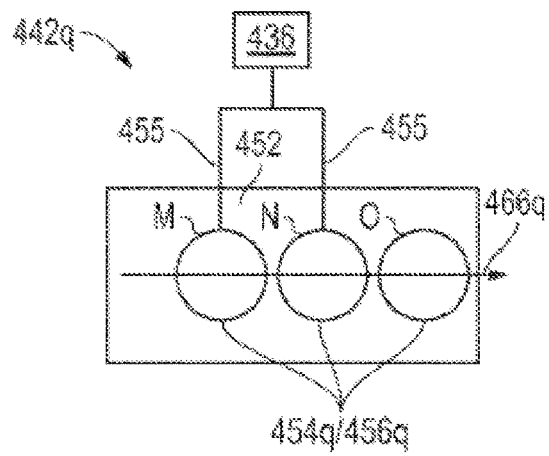
FIG. 4B illustrates various components of an example device that can implement embodiments of the methods and apparatus for determining downhole fluid parameters.

FIGS. 4A and 4B are schematic views of sensing elements $442p$ and $442q$ usable as the sensing elements $242a,b$ of FIGS. 2A and 2B. Each of the sensing elements $442p,q$ has a heater $454p,q$ and a sensor $456p,q$, respectively, positioned in a sensor base 452. In the illustrated example, the sensor $456p,q$ is a temperature sensor (or temperature sensor) capable of measuring fluid temperature.

In some examples, the sensor elements $442p,q$ are calorimetric type flow sensors (or flow meters) that have two sensing elements such as, for example, a sensor for velocity measurement (scalar sensor) and a sensor for directional measurement (vector sensor). The heater $454p,q$ and the temperature sensor $456p,q$ interact to operate as velocity (or scalar) and directional (or vector) sensors.

To determine fluid velocity, the sensing elements $442p,q$ act as calorimetric sensors. The heater $454p,q$ (or hot body) of each sensor elements $442p,q$ is placed in thermal contact with the fluid in the well 104. The rate of heat loss of the heater $454p,q$ to the fluid is a function of the fluid velocity as well as thermal properties. A heat dissipation rate of the heater $454p,q$ may be measured, and a flow velocity can be determined for a known fluid. The heater $454p,q$ generates heat (e.g., from electricity), and dissipates the heat to the fluid in contact. The rate of heat generation and the temperature may be readily measurable during operation.

The temperature sensor $456p,q$ may be used to monitor ambient temperature of the fluid, while the heater $454p,q$ measures its own temperature during heating. The difference between the temperature of the heater $454p,q$ and the ambient temperature of the fluid is defined as temperature excursion. The temperature excursion, $\Delta T$, may be written as follows:

$$\Delta T = T_h - T_a. \qquad \text{Equation (1):}$$

In Equation 1, $T_a$ represents the ambient temperature of the fluid as measured by the temperature sensor; $T_h$ represents the temperature of the heater; and the temperature excursion is proportional to the heater power at a given flow condition. A thermal property between the heater and the fluid such as, for example, thermal conductance, $G_{th}$, may be calculated according to following expression:

$$G_{th} = \frac{P}{T_h - T_a} = \frac{P}{\Delta T}. \qquad \text{Equation (2)}$$

In Equation 2, P represents the heater power in steady state. The inverse of this proportionality (or the thermal conductance) correlates the flow velocity $V_{flow}$ because $V_{flow}$ is a function of $G_{th}$. As provided by Equation 1, the thermal conductance is determined from three quantities: P (the heater power), $T_h$ (the temperature of the heater) and $T_a$ (the temperature of the fluid ambient). The quantities may be measured in steady state. Theoretically, the amount of power or temperature excursion used during measurement is immaterial to resultant thermal conductance. However, power and temperature excursion may affect accuracy because physical measurements have limits. In some cases, such as the configuration of FIG. 4B, a $\Delta T$ of a few degrees in Kelvin (K) may be considered appropriate.

In other examples, other thermal properties such as, for example, a normalized power dissipation are calculated to determine the flow velocity. The normalized power dissipation may be calculated according to the following expression:

$$\frac{P}{S(T_h - T_a)}. \qquad \text{Equation (3)}$$

In Equation 3, the normalized power dissipation of the sensor is calculated by dividing the power of the heater by the temperature excursion and an area of a heating surface of the sensor, S.

The measurements taken by the calorimetric sensing elements $454p,q$ may be used obtain the heater-fluid thermal conductance, the normalized dissipated power, and/or other thermal properties. A measurement technique may involve either constant excursion or constant power. For the constant excursion technique, power sent to the heater may be regulated by electronics (e.g., the control unit 136) such that the heater temperature may be maintained at a constant excursion above the fluid ambient temperature. In steady state, the power measured is monotonically related to the thermal conductance, the normalized power dissipation, and/or other thermal properties. For the constant power technique, the heater may be supplied with a constant and predetermined power, while the heater temperature $T_h$ varies and may be determined by flow velocity.

Figure 5A:
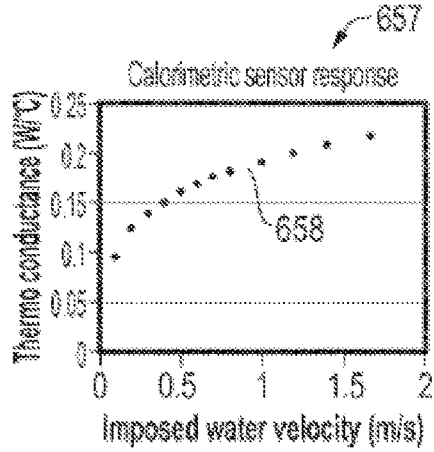
FIG. 5A is a graph illustrating sensor measurements.

FIG. 5A is a graph 657 depicting a flow response of a calorimetric sensor, such as the sensing elements $442a,b$ depicted in FIGS. 4A and 4B. The resulting thermal conductance verses flow curve 658 demonstrates that thermal conductance is non-linear relative to the flow velocity. However, the thermal conductance verses flow curve 658 is monotonic. Therefore, a correlation can be established to invert the measurement, and the flow velocity can be obtained as described in conjunction with Equations 1-3.

The measurement of flow velocity is a measurement of the thermal conductance, the normalized power dissipation, and/or other thermal properties between the heater $454p,q$ and the fluid. The measurement of thermal conductance and/or the normalized power dissipation may be determined with constant temperature excursion ($\Delta T$) or constant heater power. The constant temperature excursion may regulate temperature. The constant heater power may regulate power. Either measurement technique may involve the heater $454p,q$ and the temperature sensor $456p,q$.

Referring back to FIGS. 4A and 4B, the sensing elements $442p,q$ may also act as scalar sensors to determine fluid direction. In the illustrated example, the sensing elements $442p,q$ are capable of acting as both calorimetric sensors for determining fluid velocity and vector sensors for measuring fluid direction. Calorimetric sensors may be unable to determine fluid direction. In such examples, the calorimetric sensors may respond to fluid velocity regardless of direction. Fluid direction may be acquired by a second measurement, such as by using vector sensors capable of fluid direction detection. Fluid direction may also be acquired by, for example, the sensing elements 442p,q of FIGS. 4A and 4B configured for measurement of both fluid velocity and direction. Physics that enables directional detection may also involve detection of asymmetry in temperature between upstream and downstream sensing elements (e.g., caused by heat from the heater 454p of the upstream sensing element), such as the upstream sensing elements 242a and the downstream sensing elements 242b of FIG. 2A.

FIGS. 4A and 4B depict configurations of the sensing element 442p,q capable of detecting both fluid flow rate and direction. FIG. 4A depicts a thermocouple (TC) sensing element 442p. FIG. 4B depicts a dual sensing element 442q. The base 452 for each sensing element 442p,q is sized for hosting the heater 454p,q, the sensor 456p,q and/or other devices therein.

In some examples, the base 452 has a minimum thickness, or is recessed in the downhole tool, to prevent damage in the well 104. The sensor base 452 is positionable downhole, for example, on the treatment device 122, 222 and/or the coiled tubing 114, 214 (FIGS. 1, 2A, 2B). The base 452 may be round as shown in FIG. 4A or rectangular as shown in FIG. 4B. The base 452 may be made of epoxy, PEEK molding and/or any other material.

The heater 454p,q and the temperature sensor 456p,q may be positioned in close proximity in base 452, but are thermally isolated from each other. In the illustrated example, because the heater 454p,q creates a temperature gradient in the fluid, the temperature sensor 456p,q is provided with sufficient thermal isolation from the heater 454p,q to prevent the temperature sensor 456p,q from being disturbed by the heat flux of the heater 454p,q or thermally coupling with the heater 454p,q, which may result in an erroneous measurement value. The temperature sensor 456p,q may optionally be positioned in a separate package spaced from the heater 454p,q.

The TC sensing element 442p of FIG. 4A is depicted as having a pair of TC junctions (or sensors) $456p_{1,2}$ on either side of a heating pad (or heater) 454p. The TC junctions $456p_{1,2}$ are linked by a metal wire 460. Each TC junction $456p_{1,2}$ has a TC pad with leads 462a,b extending therefrom. In some examples, the leads 462 are also wires operatively coupled to a controller 436 for operation therewith.

The TC junctions 456p positioned on either side of the heater 454p may be used to detect a temperature imbalance therebetween, and convert it into a TC voltage. A small voltage is present if the two TC junctions $456p_{1,2}$ are at a different temperatures. The TC junctions $456p_{1,2}$ are positioned very close to the heater 454p (one on each side) for maximum contrast of temperature. At zero flow, the heater 454p may heat up both TC junctions $456p_{1,2}$. However, the heating does not produce voltage.

Two metal pads 464p are depicted as supporting the TC junctions $456p_{1,2}$. The metal pads 464p may be provided to improve the thermal contact between the TC junctions $456p_{1,2}$ and the fluid. The metal pads 464p may be useful in cases where the TC junctions $456p_{1,2}$ are of a small size. The metal pads 464p and the TC junctions $456p_{1,2}$ may be held together by thermal adhesives such as silver epoxies or any other thermally conductive adhesives. The metal pads 464p are positioned in alignment with the heater 454p, thereby defining a flowline 466p along the sensing element 442p as indicated by the arrow.

Figure 5B:
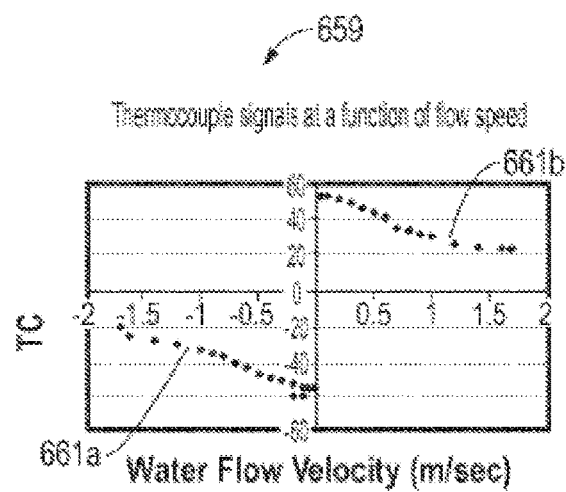
FIG. 5B is another graph illustrating sensor measurements.

TC voltage (y-axis) as a function of flow velocity (x-axis) is show in a graph 659 of FIG. 5B. The graph 659 exhibits an odd function of the flow velocity measured by the TC junctions $456p_{1,2}$. The magnitude of a maxima near zero flow tapers off gradually with increasing velocity. At zero crossing, the TC signal output undergoes an abrupt change in polarity from negative to positive as indicated by curves 661a,b, respectively. This change in signal polarity may be used to detect the fluid direction as described in greater detail below.

Figure 6:
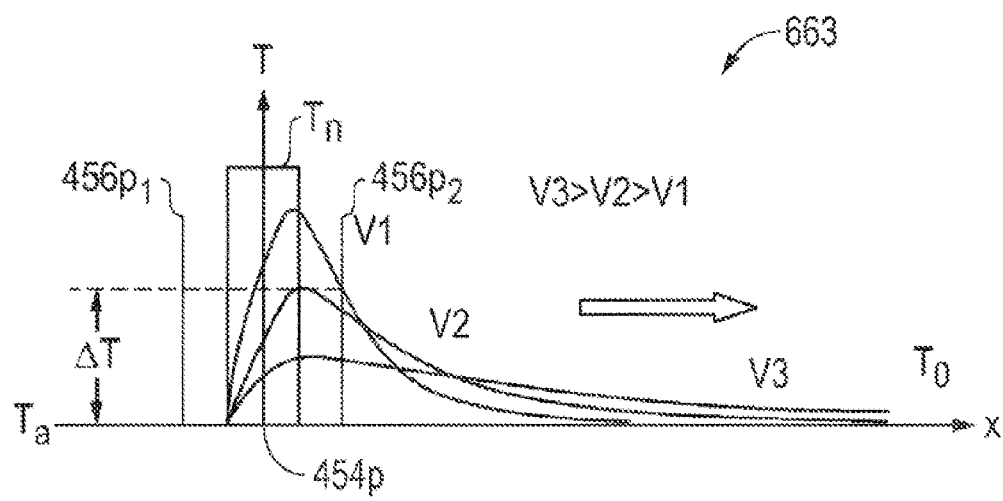
FIG. 6 is a graph of sensor measurements and fluid flow based on the sensor measurements.

The temperature profile along a flow stream of, for example, the sensing element 442p is shown schematically in FIG. 6. FIG. 6 is a graph 663 depicting temperature (y-axis) versus velocity (x-axis). As depicted by this graph, the heater 454p generates a constant heat $T_h$ measurable by the TC junction $456p_{1,2}$ on either side thereof. Heat from the heater 454p is carried downstream by the fluid forming a hot stream. The velocity V1, V2 and V3 are measured at, for example, different time intervals. Visibility of the thermal gradient may depend on the velocity. The thermal gradient between upstream and downstream is detectable with the sensor element 442p. This creates a temperature contrast between the upstream and downstream TC junctions $456p_{1,2}$. This indicates that the flow is moving towards the TC junctions $456p_{1,2}$, thereby indicating fluid flow direction. By detecting asymmetry between the TC junctions $456p_{1,2}$, the fluid direction can be determined as indicated by the arrow.

The dual-element sensing element 442q of FIG. 4B is depicted as having two identical elements (sensors/heaters) 456q/454q. The sensors/heaters 456q/454q are depicted as Element M and Element N in the sensing element 442q. In some examples, the heater 454q and the sensor 456q (and, therefore, Elements M and N) are interchangeable in function and operation. In some such cases, the sensor 456q is capable of performing the functions of the heater and the heater 454q is capable of performing the functions of the sensor. The Elements M and N are operatively linked via links 455 to the controller 436 for operation therewith.

In some examples, a desired measurement may be operated in self-referenced mode in which a single Element M or N plays a dual role, both as heater and as temperature sensor. In some such cases, the heater and the temperature sensor may utilize a time multiplexing technique. In some examples, the role of the heater 454q and temperature sensor 456q may be reassigned at anytime. This measurement scheme may be used to provide flexibility in designing and/or operating the sensor element 442q, which may be tailored to a particular application.

An asymmetry of temperature between the identical Elements M and N is detectable by the dual-element sensor 442q. The two identical Elements M and N are positioned along a line of flow of the fluid as indicated by the arrow. The Elements M and N may be positioned in close proximity, for example, within the same base (or package) 452.

Measurement by the sensor element of FIG. 4B may be achieved using various methods. A first method involves measuring the heater power in flow using Element M as the heater and Element N as the temperature sensor. After a stable reading is attained, the roles of Elements M and N interchange and the measurement is repeated. Comparing the power of the two measurements, fluid direction can be ascertained. The heater that consumes more power is located upstream, provided that the flow does not vary in the meantime. A second method that may be used involves measuring by heating both elements M and N simultaneously with the same amount of power. The measurements of each element may be compared. Whichever element reveals a higher temperature is downstream in the direction of the fluid flow. A third method that may be used involves watching the temperature of Element M while switching on and off Element N at a certain power level. If an alteration of temperature is noticed, Element N may be assumed to be upstream of Element M. No change may suggest otherwise.

With the first two methods, where quantities are compared across Elements M and N, a good match of characteristics of the two elements M, N reduces potential errors. The match of elements may be achieved by calibration and normalization. The third method, on the other hand, may be used without as good of a match. Dual-element sensors are usable, for example, for bi-directional flow.

When the temperature sensor $456p,q$ and the heater $454p,q$ of FIGS. 4A and 4B reside in the same package (for instance, due to space constraint), the temperature sensor $456p,q$ is positioned upstream of the heater $454p,q$ (or element M is upstream of Element N). If flow goes in both directions, the temperature sensor $456p,q$ and heater $454p,q$ (or Elements M and N) may be positioned in a side-by-side (or flowline) configuration in line with the flow of the fluid as shown in the sensing elements $442p,q$ of FIGS. 4A and 4B.

While FIG. 4A depicts a single heater $454p$ with a pair of TC junctions $456p$ and FIG. 4B depicts a single heater $454p$ with a single temperature sensor $456q$, other examples employ multiple heaters $454p,q$ and/or sensors $456p,q$. Additional sensors and/or other devices may be incorporated into the sensing elements $442p,q$ and/or used in combination therewith. In sensor systems including multiple heaters $454p,q$, one temperature sensor $456p,q$ can serve multiple heaters $454p,q$. Some multi-elements sensors have more than two elements (e.g., M, N, P, D . . . ). As shown in FIG. 4B, a third element O may be provided. In another method of measurement, the three or more elements (e.g., M, N, O) may be used to detect fluid direction by heating a middle element and comparing the temperature between upstream and downstream elements thereabout.

As shown, the sensing elements $442p,q$ of FIGS. 4A and 4B (and/or the sensors, heaters, elements and/or other components used therein and/or therewith) are operatively coupled to the controller 436 for providing power, collecting data, controlling and/or otherwise operating the sensing element $442p,q$. The controller 436 may be, for example, the logging tool 128, the control unit 136 and/or other electronics capable of providing power, collecting data, controlling and/or otherwise operating the temperature sensors $456p,q$, heater $456p,q$ and/or other elements of the sensing elements $442p,q$. The power sources may be batteries, power supplies and/or other devices internal to and/or external to the sensing elements. In some cases, other devices such as the logging tool 128 of FIG. 1A may provide power thereto. Such electronic devices may be internal and/or external to the sensing elements. Communication devices may be provided to wire and/or wirelessly coupled the sensing elements to downhole and/or surface communication devices for communication therewith. In some cases, communication devices, such as transceivers may be provided in the sensing elements. In other cases, the sensing elements may be linked to the logging tool 128 (FIG. 1A) or other devices for communication as desired.

The sensing elements are also operatively coupled to and/or in communication with databases, processors, analyzers, and/or other electronic devices for manipulating the data collected thereby. The power, electronic and/or communication devices may be used to manipulate data from the sensing elements, as well as other sources. The analyzed data may be used to make decisions concerning the wellsite and operation thereof. In some cases, the data may be used to control the well operation. Some such control may be done automatically and/or manually as desired.

Figure 7:
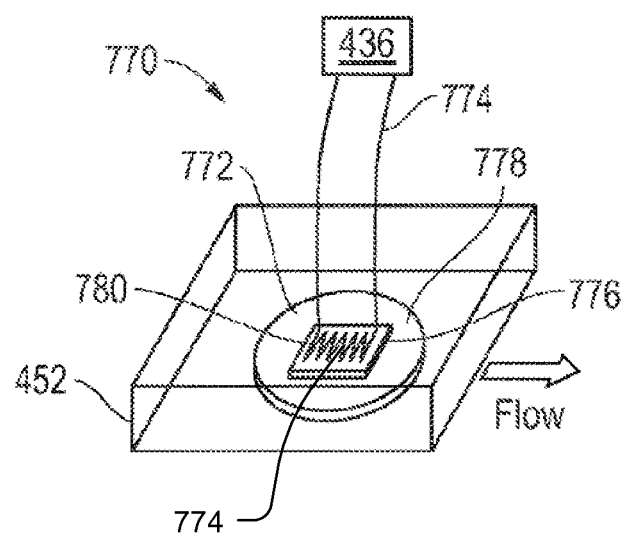
FIG. 7 illustrates various components of an example device that can implement embodiments of the methods and apparatus for determining downhole fluid parameters.

While elements of the heater and the temperature sensor may be physically identical, the sensor can have a variety of types, forms and/or shapes. FIG. 7 depicts the sensor 770 usable as an element of the sensor elements $454p,q$ of FIGS. 4A and/or 4B. FIG. 7 depicts the sensor 770 usable as the heater $454q$ and/or the temperature sensor $456q$, as elements M, N and/or O, or in combination therewith. A shown, the sensor 770 is positionable in the base 452. The sensor 770 may be operatively coupled to the controller 436 via wires 774 for operation therewith in the same manner as previously described for the sensor elements $442p,q$.

The example sensor 770 of FIG. 7 is an RTD type sensor with a resistance that varies with temperature. In some examples, the sensor 770 is used for temperature sensing purposes. However, the sensor 770 may generate heat when current passes through the sensor 770. Thus, the example sensor 770 can be used both as a heater and a temperature sensor (e.g., $454p,q$ and $456p,q$ of FIG. 4B).

A thin-film type RTD capable of use as both a heater and temperature sensor may be used so that it can interchangeably operate as the Element M, N and/or O of FIG. 4B. As shown in FIG. 7, the sensor 770 positioned in the base 452 has a front surface (or contact surface) 772 positionable adjacent the fluid for taking measurements therefrom. In some examples, the sensor 770 employs platinum in the form of either wire or thin film (or resistor) 774 deposited on a heat-conductive substrate 776, such as sapphire or ceramic. The wire 774 is positioned in the film 776 and extends therefrom for operative linkage with the controller 436. The heat-conductive substrate 776 may be adhered or bonded to a thin pad 778 (made of, for example, Inconel or ceramic substrate) by a thermally conductive adhesive 780, such as silver epoxy, or by brazing. In some examples, such bonding provides low thermal resistance.

In the illustrated example, the sensor 770 is wrapped in protective packaging, but they may differ by thermal mass and, hence, response time. The shape of the pad 778 may be square, circular or any other shape capable of supporting the RTD in the base 452. In some examples, the pad 778 has a dimension of about 10 mm (or more or less), and a thickness sufficient for mechanical viability. The thickness and material selected may determine the performance of heater-fluid thermal contact.

The example sensor 770 may be configured with a large surface area for contact with the fluid and/or large thermal mass for passage of heat therethrough. A larger thermal mass may result in a relatively slower measurement response. However, the thermal mass may also assist in reducing (e.g., averaging out) spurious variations in readings caused by turbulence. Sensor electronics may also be provided to reduce spurious variations.

The sensor 770 and/or the sensing element $442q$ may be configured in a surface (or non-intrusive) form with a low profile (or thickness) as shown in FIGS. 7 and 4B. The sensor 770 and/or the sensing element $442q$ may be positionable downhole via a downhole tool (e.g., coiled tubing system 102 of FIG. 1A) extending a small distance (if any) therefrom. This low profile or non-intrusive surface form may be provided to reduce the disturbance to the fluid flowing across the sensor, while still allowing for measurement of the fluid. Moreover, the low profile surface form may also be configured to limit the amount of protrusion from the downhole the tool and, therefore, potential damage thereto.

Figure 8:
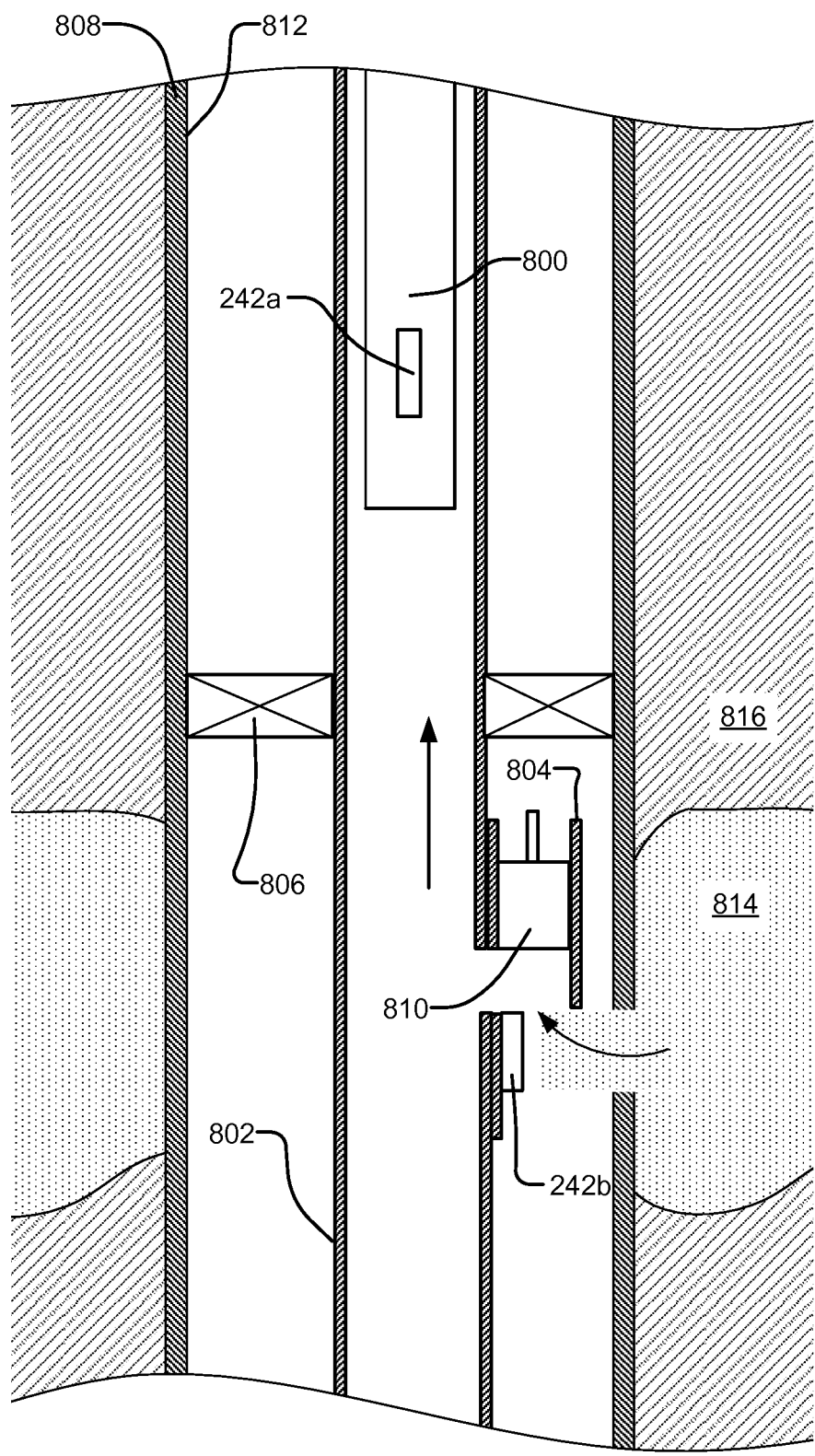
FIG. 8 illustrates various components of the example device of FIG. 2E that can implement embodiments of the methods and apparatus for determining downhole fluid parameters.

FIG. 8 illustrates an example production logging tool 800 disclosed herein. The example production logging tool 800 includes at least one of the example sensing elements 242a. In the illustrated example, a plurality of completion tools such as, for example, a production tube 802, a collection tube 804, a packer 806, a casing 808, a valve 810, and/or any other suitable semi-permanent and/or permanent completion tools are disposed in a wellbore 812. In the illustrated example, the production logging tool 800 is disposed in the production tube 802.

In the illustrated example, the collection tube 804 is used to produce fluid from a fluid reservoir 814 of a subterranean formation 816 adjacent the wellbore 812. In the illustrated example, the production tube 802 is in fluid communication with the collection tube 804, and the collection tube 804 is in fluid communication with the reservoir 814. The valve 810 is disposed in the example collection tube 804. In some examples, the valve 810 is controlled (e.g., by the example control unit 136) to control flow of the fluid from the reservoir 814 into the production tube 802 via the collection tube 804. In some examples, one or more of the sensing elements 242b are disposed on one or more of the completion tools. In the illustrated example, the sensing element 242b is disposed on the collection tube 804. In other examples, one or more of the sensing elements 242b are disposed on other completion tools.

In some examples, the fluid includes gas, water, hydrocarbons, particulates (e.g., sand, sediment, rock, etc.), paraffin, asphaltenes, polymer (e.g., a polymer based fluid), a viscoelastic fluid, a surfactant, different phases (e.g., liquids, gases, etc.), fluids of different viscosities, etc. In some examples, the fluid flows at a velocity of about zero centimeters per second to about ten centimeters per second. In other examples, the fluid flows at other velocities. In the illustrated example, as the fluid flows from the fluid reservoir 814 through the collection tube 804 and/or the production tube 802, the example sensing element 242a and/or the example sensing element 242b may be used to determine the velocity of the fluid.

The example sensing elements 242a and 242b may be used to determine the velocity of the fluid when the fluid is flowing at a velocity outside of a velocity range measurable via a spinner flowmeter. In some conditions, the spinner flowmeter is inoperable (i.e., a spinner of the spinner flowmeter does not spin) and, thus, cannot be used to measure the velocity of the fluid. For example, when the velocity of the fluid is such that force applied to the spinner via the fluid is less than a friction force to spin the spinner, the spinner does not spin and, thus, the velocity of the fluid is outside of the velocity range measurable via the spinner flowmeter. In some such examples, the spinner does not spin if the velocity of the fluid is less than ten centimeters per second. In some examples, the velocity range measurable via the spinner flowmeter is affected by a viscosity and/or a density of the fluid. In some examples, a presence of debris, asphaltenes, polymer, viscoelastic fluids, different phases, surfactant, and/or other solids, liquids, and/or gases in the fluid may render the spinner flowmeter inoperable.

In the illustrated example, the sensing element 242a and the sensing element 242b are capable of sensing fluid flow when the fluid is flowing at a velocity of about zero meters per second to about ten meters per second. Other examples are capable of sensing fluid flow at other velocities. Thus, the example sensing elements 242a and 242b may be used to determine the velocity of the fluid when the fluid is flowing at the velocity outside of the velocity range measurable via the spinner flowmeter.

Figure 9:
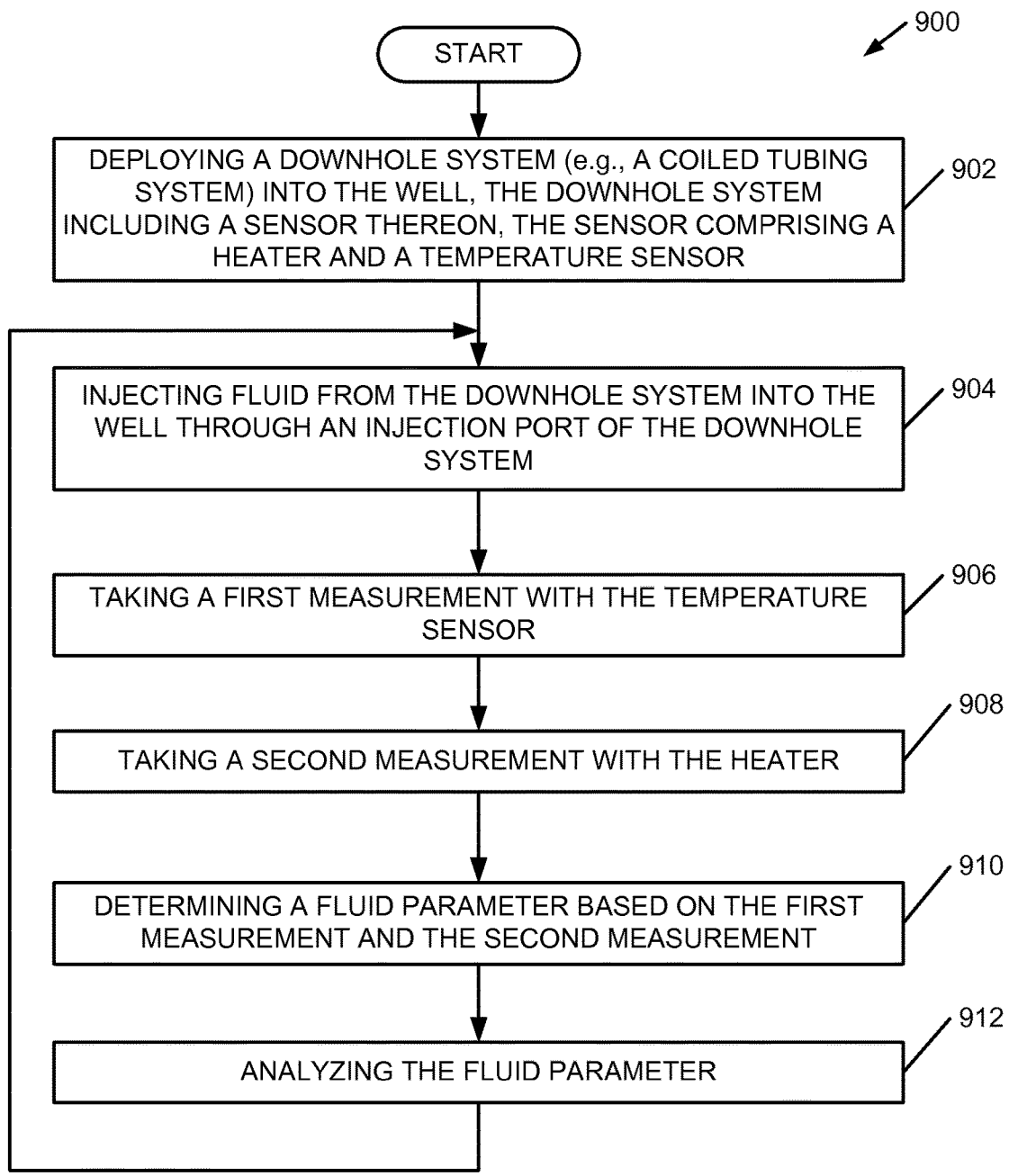
FIG. 9 illustrates example method(s) for determining downhole fluid parameters in accordance with one or more embodiments.
Figure 10:
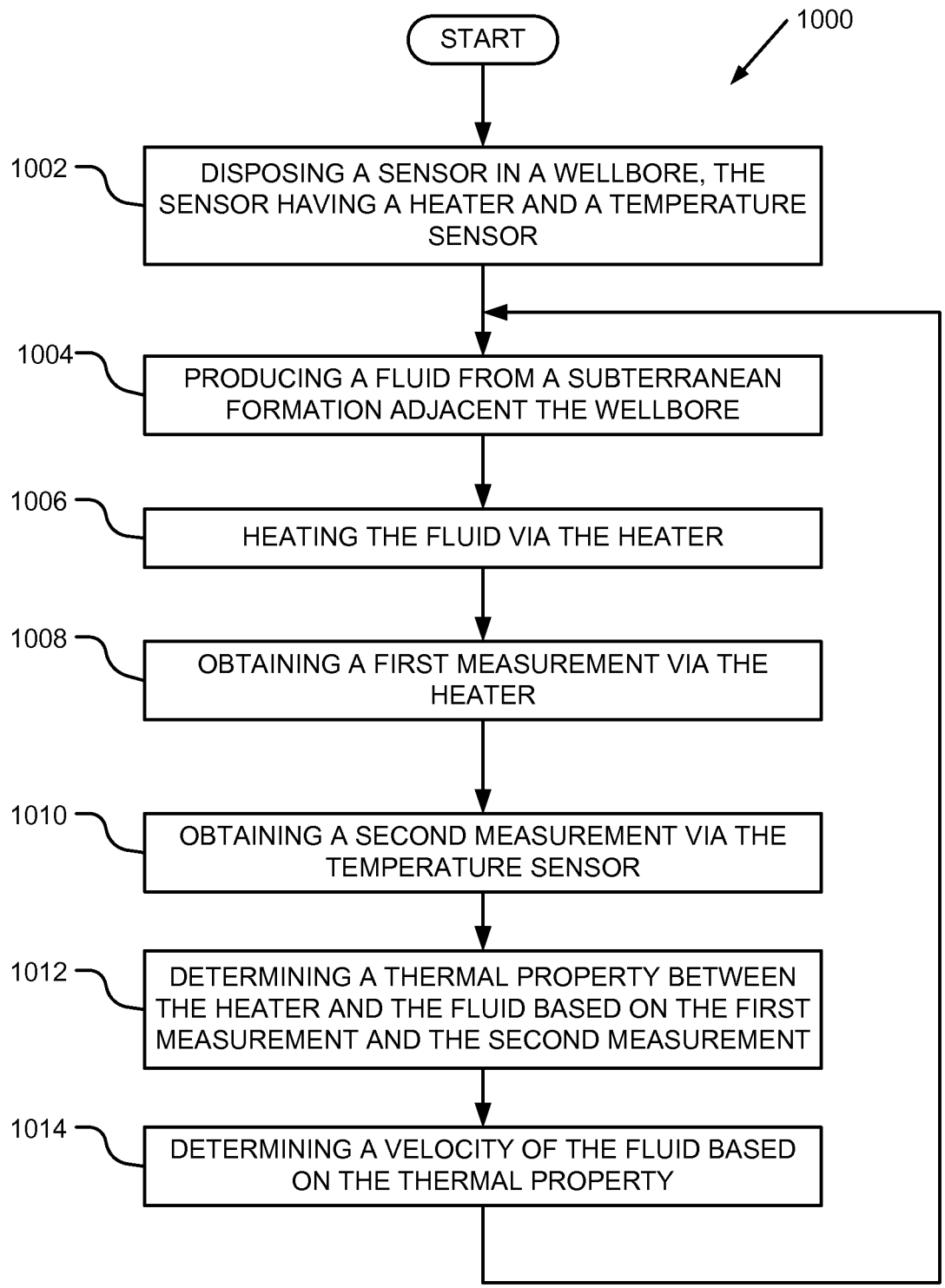
FIG. 10 illustrates example method(s) for determining downhole fluid parameters in accordance with one or more embodiments.

FIGS. 9-10 are flowcharts representative of example methods disclosed herein. At least some of the example methods of FIGS. 9-10 may be carried out by a processor, the logging tool 128, the controller 436 and/or any other suitable processing device. In some examples, at least some of the example methods of FIGS. 9-10 are embodied in coded instructions stored on a tangible machine accessible or readable medium such as a flash memory, a ROM and/or random-access memory RAM associated with a processor. Some of the example methods of FIGS. 9-10 may be implemented using any combination(s) of application specific integrated circuit(s) (ASIC(s)), programmable logic device(s) (PLD(s)), field programmable logic device(s) (FPLD(s)), discrete logic, hardware, firmware, etc. Also, one or more of the operations depicted in FIGS. 9-10 may be implemented manually or as any combination of any of the foregoing techniques, for example, any combination of firmware, software, discrete logic and/or hardware.

Further, although the example methods are described in reference to the flowcharts illustrated in FIGS. 9-10, many other methods of implementing the example methods may be employed. For example, the order of execution of the blocks may be changed, and/or some of the blocks described may be changed, removed, sub-divided, or combined. Additionally, any of the example methods of FIGS. 9-10 may be carried out sequentially and/or carried out in parallel by, for example, separate processing threads, processors, devices, discrete logic, circuits, etc.

FIG. 9 illustrates an example method 900 disclosed herein that may be used to determine one or more fluid parameters. At block 902, a downhole system such as, for example, the coiled tubing system 100 of FIG. 1A is deployed into a well with a sensor (e.g., one of the example sensor elements 242a,b) thereon. In some examples, the sensor includes a heater (e.g., the example heater 454 of FIG. 4, the example RTD sensor 770 of FIG. 7) and a temperature sensor (e.g., the example temperature sensor 456 of FIG. 4, the example RTD sensor 770 of FIG. 7). At block 904, fluid is injected from the downhole system into the well via an injection port (e.g., the example injection port 224 of FIG. 2) of the downhole system.

At block 906, a first measurement (e.g., a temperature of the fluid) is taken with the temperature sensor. At block 908, a second measurement (e.g., power dissipated via the heater, a temperature of the heater, etc.) is taken with the heater. At block 910, a fluid parameter (e.g., a fluid velocity, a direction of fluid flow) is determined based on the first measurement and the second measurement. At block 912, the fluid parameter is analyzed. In some examples, the measurements and/or the parameter are stored, processed, reported, and/or manipulated, etc.

FIG. 10 illustrates another example method 1000 disclosed herein, which may be used to determine a downhole fluid parameter. The example method 1000 begins by disposing a downhole tool (e.g., the example production logging tool 800, the production tubing 802, the collection tubing 804, the packer 806, the casing 808, the valve 810, and/or any other production logging tool, semi-permanent completion tool, and/or permanent completion tool) in a wellbore. The downhole tool includes a sensor (e.g., one of the example sensor elements 242a,b) having a heater (e.g., the example heater 454 of FIG. 4, the example RTD sensor 770 of FIG. 7) and a temperature sensor (e.g., the example temperature sensor 456 of FIG. 4, the example RTD sensor 770 of FIG. 7). In some examples, the sensor is capable of sensing fluid flow of a fluid flowing at a velocity of about zero meters per second to about ten meters per second.

At block 1004, a fluid is produced from a subterranean formation adjacent the wellbore. In some examples, the fluid includes gas, water, hydrocarbons, particulates (e.g., sand, sediment, rock, etc.), paraffin, asphaltenes, polymer (e.g., a polymer based fluids, a viscoelastic fluid, a surfactant, different phases (e.g., liquids, gases, etc.), fluids of different viscosities, etc. In some examples, the fluid flows into and/or through the downhole tool (e.g., via the example completion tube 812 of FIG. 8) at a velocity of about zero centimeters per second to about ten centimeters per second. In other examples, the fluid flows at other velocities.

At block 1006, the fluid is heated via the heater. At block 1008, a first measurement is obtained via the heater. In some examples, the first measurement includes a temperature of the heater and/or a power dissipated by the heater. At block 1010, a second measurement is obtained via the temperature sensor. The second measurement may be a temperature of the fluid. Based on the first measurement and the second measurement, a thermal property between the heater and the fluid is determined (block 1012). In some examples, the thermal property is a normalized power dissipation of the sensor, which may be determined using Equation 3 above. Based on the thermal property, the velocity of the fluid is determined (block 1014).

Although only a few example embodiments have been described in detail above, those skilled in the art will readily appreciate that many modifications are possible in the example embodiments without materially departing from this disclosure. Accordingly, such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. §112, paragraph 6 for any limitations of any of the claims herein, except for those in which the claim expressly uses the words 'means for' together with an associated function.

The Abstract at the end of this disclosure is provided to comply with 37 C.F.R. §1.72(b) to allow the reader to quickly ascertain the nature of the technical disclosure. It is submitted with the understanding that it will not be used to interpret or limit the scope or meaning of the claims.

What is claimed is:

1. A method, comprising:
    disposing a sensor in a fluid in a wellbore, the sensor comprising a heater and a temperature sensor, the fluid flowing at a velocity of about zero centimeters per second to about ten centimeters per second, the fluid comprising at least one of particulates, paraffin and asphaltenes;
    obtaining a first temperature measurement via the heater;
    obtaining a second temperature measurement via the temperature sensor; and
    based on the first temperature measurement and the second temperature measurement, determining the velocity of the fluid.

2. The method of claim 1 wherein the fluid comprises different phases.

3. The method of claim 1 wherein disposing the sensor in the fluid comprises disposing a production logging tool in the wellbore.

4. The method of claim 1 further comprising producing the fluid from a subterranean formation adjacent the wellbore.

5. The method of claim 1 wherein disposing the sensor in the fluid comprises disposing the sensor on a completion tool.

6. The method of claim 1 wherein the sensor is capable of sensing the fluid flowing at a velocity of about zero meters per second to about ten meters per second.

7. A method, comprising:
    disposing a downhole tool in a fluid in a wellbore, the downhole tool including a sensor comprising a heater and a temperature sensor, the fluid flowing at a velocity less than about ten centimeters per second, the fluid comprising one of particulates, paraffin and asphaltenes;
    determining a thermal property selected from a temperature excursion or a normalized power dissipation between the heater and the fluid via the sensor; and
    based on the thermal property, determining the velocity of the fluid.

8. The method of claim 7 wherein the fluid comprises different phases.

9. The method of claim 7 wherein disposing the downhole tool in the fluid comprises disposing a production logging tool in the fluid.

10. The method of claim 7 further comprising producing the fluid from a subterranean formation adjacent the wellbore.

11. The method of claim 7 wherein disposing the downhole tool in the fluid comprises disposing a completion tool in the wellbore.

12. A method, comprising:
    disposing a downhole tool in a wellbore, the downhole tool including a sensor comprising a heater and a temperature sensor, wherein the sensor is capable of sensing fluid flow having of a velocity of about zero meters per second to about ten meters per second;
    producing fluid comprising at least one of paraffin and asphaltenes from a subterranean formation adjacent the wellbore;
    obtaining a response of the sensor; and
    based on the response, determining the velocity of the fluid.

13. The method of claim 12 wherein the fluid is flowing at the velocity of about zero centimeters per second to about ten centimeters per second.

14. The method of claim 12, wherein the fluid comprises particulates.

15. The method of claim 12 wherein the fluid comprises different phases.

16. The method of claim 12 wherein disposing the downhole tool in the wellbore comprises disposing a completion tool in the wellbore.

17. The method of claim 12 wherein disposing the downhole tool in the wellbore comprises disposing a production logging tool in the wellbore.

18. The method of claim 12 further comprising collecting downhole data with the downhole tool.

* * * * *